(12) United States Patent
Ichikawa et al.

(10) Patent No.: US 7,310,453 B2
(45) Date of Patent: Dec. 18, 2007

(54) OPTICAL MODULATOR

(75) Inventors: Junichiro Ichikawa, Tokyo (JP);
Masayuki Ichioka, Tokyo (JP);
Tokutaka Hara, Tokyo (JP); Yuji Yamane, Tokyo (JP)

(73) Assignee: Sumitomo Osaka Cement Co., Ltd., Tokyo (JP)

(*) Notice: Subject to any disclaimer, the term of this patent is extended or adjusted under 35 U.S.C. 154(b) by 0 days.

(21) Appl. No.: 10/525,903

(22) PCT Filed: Aug. 29, 2003

(86) PCT No.: PCT/JP03/11012

§ 371 (c)(1),
(2), (4) Date: Sep. 6, 2005

(87) PCT Pub. No.: WO2004/021075

PCT Pub. Date: Mar. 11, 2004

(65) Prior Publication Data

US 2006/0110089 A1    May 25, 2006

(30) Foreign Application Priority Data

Aug. 30, 2002 (JP) .............................. 2002-254938

(51) Int. Cl.
*G02F 1/035* (2006.01)
(52) U.S. Cl. .................. 385/3; 385/2; 385/3; 385/14; 385/15; 385/45
(58) Field of Classification Search ............... 385/2–3, 385/14–15, 45
See application file for complete search history.

(56) References Cited

U.S. PATENT DOCUMENTS 5,627,920 A * 5/1997 Kato et al. .................. 385/2

6,480,639 B2 * 11/2002 Hashimoto et al. .......... 385/14

FOREIGN PATENT DOCUMENTS

| JP | 63-070827 | 3/1988 |
|---|---|---|
| JP | 63-250611 | 10/1988 |
| JP | 01-126605 | 5/1989 |
| JP | 01-134402 | 5/1989 |
| JP | 1-142907 | 9/1989 |
| JP | 02-032305 | 2/1990 |
| JP | 02-081005 | 3/1990 |

(Continued)

OTHER PUBLICATIONS

Japan Patent Office, Notification of Reason for Refusal in JP 2002-254938, Apr. 18, 2006, Japan Patent Office, Japan.

*Primary Examiner*—Brian Healy
*Assistant Examiner*—Guy G Anderson
(74) *Attorney, Agent, or Firm*—Chapman and Cutler LLP

(57) ABSTRACT

An optical modulator restricted in a photorefractive phenomenon caused by a stray light in an optical modulator, and improved in the quenching ratio characteristics of a signal light. The optical modulator comprises a substrate consisting of a material having an electro-optic effect, an optical waveguide formed on the substrate, and a modulating electrode for allowing an electric field to work on the optical waveguide and changing the phase of light passing through the optical waveguide, characterized in that stray light removing means are provided on the surface of the substrate.

17 Claims, 5 Drawing Sheets

FOREIGN PATENT DOCUMENTS

| | | |
|---|---|---|
| JP | 03-148625 | 6/1991 |
| JP | 03-259204 | 11/1991 |
| JP | 04-333829 | 11/1992 |
| JP | 06-186451 | 7/1994 |
| JP | 07-181045 | 7/1995 |

* cited by examiner (a)

(b)

OPTICAL MODULATOR

BACKGROUND OF THE INVENTION (1) Field of the Invention

The present invention relates to an optical modulator provided outside of a light source in order to modulate the light from the light source, in particular to an optical modulator restricting a photorefractive phenomenon in the optical modulator.

(2) Related Art Statement

A dense wavelength division multiplexing (DWDM) technology and high speed communication technology have been developed for optical communication systems corresponding to an increase in the demand for high speed, large capacity data communication systems recently. Particularly, although the modulation frequency of an optical modulator is mostly 10 GHz, high speed modulation more than 40 GHz would also be required from now on.

As the optical modulator which corresponds to high speed modulation, the combination of CW (Continuous Wave) laser and the Mach-Zehnder(MZ) type external optical modulator (hereinafter described as LN optical modulator) using the material with an electro-optic effect, such as lithium niobate(LN), have been proposed and put to practical use.

Because LN optical modulator has small wavelength dependency, it is suitable for application in DWDM type optical modulator. Also, because there is no modulation bandwidth limit of dielectric loss, it enables extremely high speed modulation.

Like the optical modulator of 40 GHz, by increasing the light input power inputted into an LN optical modulator for the long distance transmission, degradation of an extinction ratio, increase of an optical loss and fluctuation of the bias point are induced. Especially when the light input power is more than 10 mW, such problems become evident. As a result of studies by the present inventors, they found out that the major factor is that the stray light generated from the input part which inputs laser light to an optical modulator and from an optical waveguide in the optical modulator, and the signal light which passes through the optical waveguide, in particular, interfere mutually, a photorefractive phenomenon is generated, and grating is written at the optical waveguide part by spatial overlap of stray beam and propagating beam.

Such grating written at the optical waveguide will cause degradation of the extinction ratio by reflecting the signal light that passes through the optical waveguide, in a direction opposite to the traveling direction, or by reflecting it outward from the optical waveguide.

The photorefractive phenomenon means the phenomenon that exposure to light varies the refractive index of an electro-optic material. In particular, due to the characteristic that a charge transfer is generated in the material by light, when optical distribution causes spatial intensity distribution of light, re-distribution of charge occurs corresponding to said intensity distribution of light, and this uneven distribution of charge varies an internal electric field topically. Because the internal electric field varies the refractive index of the material, refractive index distribution of the material that corresponds to the intensity distribution of light is formed resultantly.

Further, the photorefractive phenomenon has the characteristic that the refractive index changes little by little when being continuously exposed to light, and a light scattering gets stronger and stronger as time goes by. Therefore, in drive of an optical modulator for many hours, the deterioration of the optical modulator characteristics, especially degradation of the extinction ratio, increase of the optical loss, etc. becomes prominent.

The present invention intends to solve the above problems, to restrict the photorefractive phenomenon caused by a stray light in the optical modulator, and to provide the optical modulator which improves the characteristics relevant to the extinction ratio or optical loss of a signal light.

Particularly, the photorefractive phenomenon tends to occur for the optical modulator having a Mach-Zehnder type optical waveguide since there are many opportunities of interference with the stray light due to escaping light from a branching point of the branching optical waveguide and longer optical waveguide active part that allows phase modulation to work on the signal light passing through the optical waveguide. Further, for the optical modulator having so called dual electrode construction which drive controls several optical waveguide active parts by an independent modulating electrode separately, it is necessary to keep enough distance between modulating electrodes for avoiding cross talk between said modulating electrodes. This makes the length of the waveguide after the branching point of the branching optical waveguide longer, which increases the chances of interfering with the stray light and the photorefractive phenomenon tends to occur as a result.

SUMMARY OF THE INVENTION

In order to solve the above described problems, the invention related to claim 1 provides an optical modulator comprising a substrate consisting of a material having an electro-optic effect, an optical waveguide formed on said substrate, and a modulating electrode for allowing an electric field to work on said optical waveguide, and changing the phase of light passing through said optical waveguide, wherein stray light rejection means are provided on the surface of said substrate.

In accordance with the invention related to claim 1, the stray light rejection means avoids a diffusion of the stray light, in particular, that scatters parallel to the surface of the substrate, out of the stray light escaping from the optical waveguide formed on the substrate of the optical modulator. Thus, the stray light doesn't enter another optical waveguide in the substrate, the stray light and a signal light passing through said optical waveguide don't interfere mutually, and accordingly, no interference grating is generated. This provides the possibility of restricting a photorefractive phenomenon.

In addition, the invention related to claim 2 provides the optical modulator according to claim 1, wherein said stray light rejection means comprises a stray light rejection groove, at least one part of which is formed adjacent to said optical waveguide.

In accordance with the invention related to claim 2, for composing the stray light rejection means of the groove formed on the substrate, known fine processing technologies such as etching, laser beam machining, and cutting works like sand blast can be applied, with which the stray light rejection means can easily formed. Further, because such stray light rejection groove is formed adjacent to the optical waveguide, it is possible, for example, to reject the stray light exiting from the optical waveguide before a diffusion, for the optical waveguide where the stray light exits, and to forestall the interference of the signal light passing through the optical waveguide and the stray light, for the optical waveguide which the stray light enters.

In addition, the invention related to claim 3 provides the optical modulator according to claim 2, wherein the distance between said stray light rejection groove and said optical waveguide is 10 to 100 μm at closest.

In accordance with the invention related to claim 3, by making the closest distance between the stray light rejection groove and the optical waveguide 10 μm or more, the stray light rejection groove can be formed with good accuracy without damaging the optical waveguide. Especially when the groove is formed by a mechanical processing method, the optical waveguide (or the substrate portion where the optical waveguide is formed) does not have distortion caused by mechanical processing. Therefore, it is possible to maintain the characteristics of the optical waveguide stably. Also, by making the closest distance less than 100 μm, it is possible to reject the diffusion of the stray light from the optical waveguide, or the entrance of the stray light to the optical waveguide effectively, and to restrict the photorefractive phenomenon.

In addition, the invention related to claim 4 provides the optical modulator according to any of claims 2 and 3, wherein the depth of said stray light rejection groove is almost the same or more than that of said optical waveguide.

In accordance with the invention related to claim 4, because the depth of the stray light rejection groove is almost the same or more than that of the optical waveguide, it provides the possibility of rejecting the stray light effectively in case of the diffusion of the stray light from the deepest part of the optical waveguide, or the entrance of the stray light to the deepest part of the optical waveguide.

"Almost the same" means the same depth or the depth where the effect, which is substantially no way inferior to the effect obtained from the same depth, can be obtained.

In addition, the invention related to claim 5 provides the optical modulator according to any of claims 2 to 4, wherein said stray light rejection groove is filled with a light absorber material.

In accordance with the invention related to claim 5, due to the light absorber material filled in the stray light rejection groove, it is possible to obstruct the course of the stray light by said groove itself, as well as to prevent a scattering of the stray light on the surface of the groove with the light absorber material. As a result, the effect of rejecting the stray light improves further.

In addition, the invention related to claim 6 provides the optical modulator according to any of claims 1 to 5, wherein said optical waveguide comprises a branching optical waveguide, and at least one part of stray light rejection means is provided adjacent to said branching optical waveguide.

In accordance with the invention related to claim 6, for the optical modulator having the branching optical waveguide like a Mach-Zehnder type optical modulator, the stray light rejection means provided adjacent to the branching optical waveguide enables not only the diffusion of an escaping light, the cause of the stray light, from a branching point of the branching optical waveguide to be prevented, but also the scattering light at an input part inputting laser light from the outside of the optical modulator to be restricted not to enter the branching part of the branching optical waveguide and generate an interference grating.

In addition, the invention related to claim 7 provides the optical modulator according to any of claims 1 to 5, wherein at least one part of said stray light rejection means is provided between said optical waveguide that the electric field of the modulating electrode works on and the side face of the substrate that is close to said optical waveguide.

By providing the stray light rejection means between the optical waveguide that the electric field of the modulating electrode works on and the side face of the substrate that is close to said optical waveguide as in the invention related to claim 7, especially when an active part (hereinafter described as "optical waveguide active part") of the optical modulator that allows phase modulation to work on the signal light is relatively long compared with the entire optical waveguide as the optical modulator having the Mach-Zehnder type optical waveguide, it is possible to prevent the stray light from entering said optical waveguide active part effectively.

In addition, the invention related to claim 8 provides an optical modulator comprising a substrate consisting of a material having an electro-optic effect, an optical waveguide formed on said substrate, and a modulating electrode for allowing an electric field to work on said optical waveguide, and changing the phase of light passing through said optical waveguide, wherein a low refractive index area with the refractive index lower than that of said substrate is provided at one portion of the adjacent spaces comprising at least the lower portion and the side portion of said optical waveguide in order to prevent a stray light from entering the optical waveguide.

In accordance with the invention related to claim 8, for the stray light, in particular, that scatters in the direction of the reverse face of the substrate, out of the stray light escaping from the optical waveguide formed on the substrate of the optical modulator, the low refractive index area prevents the stray light from reentering the optical waveguide, the stray light and the signal light which passes through the optical waveguide don't interfere mutually, and no interference grating is generated. As a result, it is made possible to restrict the photorefractive phenomenon.

This is because providing the low refractive index area with the refractive index lower than that of the substrate enables the stray light entering from the material side of the substrate to be reflected at the surface of the low refractive index area (a boundary surface between a substrate material in the substrate and a material forming the low refractive index area). In particular, it is possible to leak out the escaping light from the optical waveguide, to reject only the stray light effectively which is to enter the low refractive index area from the outside of the low refractive index area (opposite to the side where the optical waveguide is formed, the boundary of which is the low refractive index area), and thereby to prevent the stray light from entering the optical waveguide. In order to prevent the stray light from entering from the reverse face side of the substrate more effectively, it is preferable to form the low refractive index area at the lower portion side or side portion side of the optical waveguide.

In addition, the invention related to claim 9 provides the optical modulator according to claim 8, wherein said low refractive index area has thickness longer than the depth of said optical waveguide in the thickness direction of the substrate from the surface of said substrate, and the refractive index between the deepest part of said low refractive index area and the reverse face of said substrate is higher than that of said low refractive index area.

In accordance with the invention related to claim 9, because the thickness of the low refractive index area has thickness longer than the depth of said optical waveguide in the thickness direction of the substrate from the surface of the substrate, it presents the possibility of preventing the stray light which is to enter the deepest part of the optical waveguide from entering. The possible range of avoiding the stray light with said low refractive index area out of the incidence angle of the stray light entering the optical waveguide depends on the refractive index and location of the low refractive index area. Particularly, it is effective to locate the low refractive index area at the lower portion side. However, it is more preferable to surround the optical waveguide with the low refractive index area entirely. This enables preventing of the stray light entering the optical waveguide effectively.

Further, by making the whole substrate from its surface to certain depth the low refractive index area, when the low refractive index are is formed, it is possible to form the low refractive index area more easily without making the pattern formation in accordance with the optical waveguide by photolithography etc.

Also, by making the refractive index between the deepest part of the lower refractive index area and the reverse face of the substrate higher than that of said low refractive index area, it is possible to avoid the stray light at the surface of the substrate, which is reflected at the reverse face of the substrate, or to prevent it from entering the low refractive index area. As a result, it is made possible to prevent the stray light from entering the optical waveguide effectively. Further, for the distribution of the refractive index between the deepest part of the low refractive index area and the reverse face of the substrate, by making the refractive index high in a stable condition, or making it growing into an high refractive index, it is possible to reject the stray light reflected at the reverse face of the substrate more effectively.

In addition, the invention related to claim 10 provides the optical modulator according to any of claims 8 and 9, wherein said low refractive index area is formed by diffusion of a low refractive index material with the refractive index lower than that of said substrate over said substrate.

In accordance with the invention related to claim 10, a refractive index adjusting means by ionic diffusion, which is frequently used in the production process of the optical modulator, is available. Without adding any special device or complicated process, but only by setting a diffusion process for forming the low refractive index area in the existing production process of the optical modulator, it is possible to produce the optical modulator having the low refractive index area easily.

In addition, the invention related to claim 11 provides the optical modulator according to any of claims 8 to 10, wherein said low refractive index area comprises MgO or ZnO as the low refractive index material.

In accordance with the invention related to claim 11, in adjusting the refractive index of the substrate by the ionic diffusion, more homogeneous low refractive index area can be formed by applying MgO or ZnO, diffusion of which is easy to adjust. In particular, it can be preferably applied to the low refractive index adjustment of an LN optical modulator, which is predominant currently.

In addition, the invention related to claim 12 provides an optical modulator comprising a substrate consisting of a material having an electro-optic effect, an optical waveguide formed on said substrate, and a modulating electrode for allowing an electric field to work on said optical waveguide, and changing the phase of light passing through said optical waveguide, wherein a high refractive index area with the refractive index higher than that of said substrate is provided on the reverse face or side face of said substrate.

The invention related to claim 12 enables reflecting of the stray light, which was reflected at the reverse face or side face of the substrate, at the boundary surface of the substrate material in the substrate and a material forming the high refractive index area, and thereby restricting of the stray light moving toward the surface of the substrate where the optical waveguide is formed.

In addition, the invention related to claim 13 provides the optical modulator according to any of claims 1 to 12, wherein antireflection treatment is given on the reverse face or side face of said substrate.

The invention related to claim 13 makes it possible to prevent the stray light from being reflected at the reverse face or side face of the substrate, and to restrict the stray light not to enter the optical waveguide.

In addition, the invention related to claim 14 provides the optical modulator according to claims 1 to 13, wherein the frequency of modulation drive is more than 40 GHz.

In accordance with the invention related to claim 14, in driving the optical modulator especially with the frequency of modulation drive more than 40 GHz where the influence of the photorefractive phenomenon becomes significant, it is possible to avoid the degradation of a superior extinction ratio or increase of an optical loss by rejecting the stray light and restricting mutual interference of the signal light passing through the optical waveguide and the stray light.

In addition, the invention related to claim 15 provides the optical modulator according to any of claims 1 to 14, wherein the input power of the light that is inputted into said optical modulator is more than 10 mW.

In accordance with the invention related to claim 15, in putting the light having an optical input power more than 10 mW especially, where the effect of the photorefractive phenomenon becomes significant, to the optical waveguide, it is possible to avoid the degradation of the superior extinction ratio or increase of the optical loss by rejecting the stray light and restricting mutual interference of the signal light passing through the optical waveguide and the stray light.

DETAILED DESCRIPTION OF THE INVENTION

In the following, the preferred embodiments of the present invention are explained in detail.

The substrate which configures an optical modulator is made of a material having an electro-optic affect, such as lithium niobate ($LiNbO_3$; hereinafter referred to as LN), lithium tantalite ($LiTaO_3$), or PLZT (lead lanthanum zirconate titanate). In particular, it is preferable to use a LiNbO$_3$ crystal, a LiTaO$_3$ crystal, or a solid solution crystal made of LiNbO$_3$ and LiTaO$_3$ due to the fact that an optical waveguide device can be easily formed of any of these crystals which have a large anisotropy. The present invention embodiment primarily refers to an example using lithium niobate (LN).

A method for forming an optical waveguide by thermal diffusion of Ti in an LN substrate, and subsequently forming an electrode directly on the LN substrate without providing a buffer layer over a portion or the entirety of the substrate, and a method for providing a buffer layer, such as SiO$_2$ which is dielectric, on an LN substrate in order to reduce the propagation loss of light in the optical waveguide and forming a modulating electrode and a grounding electrode having thickness of several tens of μm on top of the buffer layer according to the formation of a Ti•Au electrode pattern, and according to a gold plating method or the like, are cited as methods for manufacturing an optical modulator.

In general, a plurality of optical modulators are fabricated on one LN wafer, which is cut into individual optical modulators at the last stage and thereby, optical modulators are manufactured.

Figure 1:
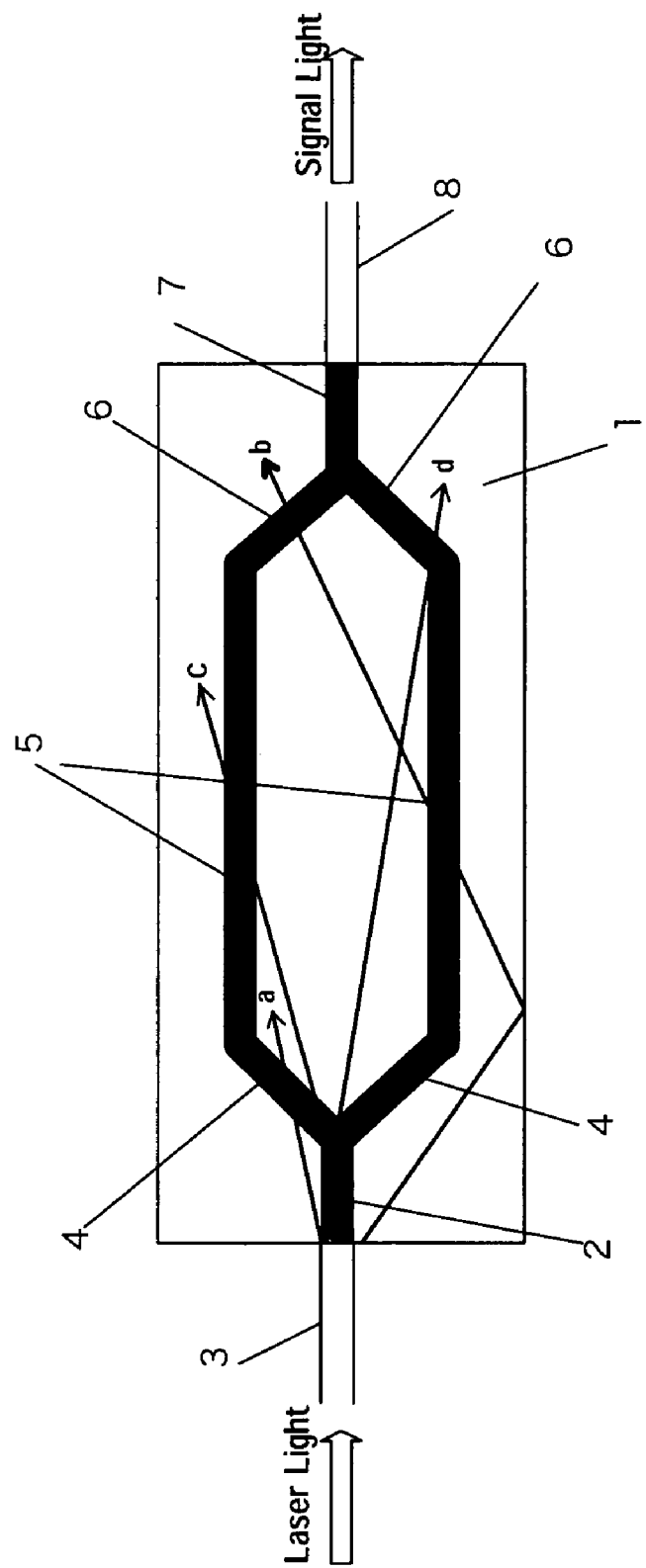
FIG. 1 is a diagram showing the generation status of the stray light in an existing optical modulator.

FIG. 1 is a diagram showing a skeletal form of an existing LN optical modulator.

Numeral 1 is the LN substrate, and the waveguide is formed on the surface of the substrate by internally diffusing Ti etc. as above described. 2 is an input waveguide, into which the light from a CW laser source, which is not shown in the diagram, is guided, and which is connected to a fiber 3 having a polarization holding feature.

The light passing through the waveguide 2 is equally divided at a 3 dB branching optical waveguide 4, which is a first branching optical waveguide, and respectively put into an optical waveguide active part 5 that configures the arm of a Mach-Zehnder (MZ) type optical waveguide.

A modulating electrode and a grounding electrode, which are not shown in the diagram, are located adjacent to said optical waveguide active part 5. The light passing through the optical waveguide active part in accordance with the signal impressed to the modulating electrode receives phase modulation. After the phase modulation, each guided wave is joined together at a second branching optical waveguide 6, and thereby generates a signal light which is strongly modulated by mutual interference.

The signal light passes through an output waveguide 7 and then, is taken outside of a module from an output fiber 8.

For the existing optical modulator, as shown in FIG. 1, stray lights a and b escape from the junction of the fiber 3 and the input waveguide 2 of the optical modulator, and further, stray lights c and d escape from the branching point of the first branching optical waveguide 4. Each stray light enters the first optical waveguide 4, the optical waveguide active part 5, the second branching optical waveguide 6, etc., interferes with the light passing through said optical waveguide and generates an interference grating as a result. This interference grating generates a photorefractive phenomenon, and thereby causes degradation of an extinction ratio of the signal light. Also, in the input waveguide 2 and the output waveguide 7, the interference grating leads to degradation of an extinction ratio since the light passing through the optical waveguide is likewise scattered.

Figure 2:
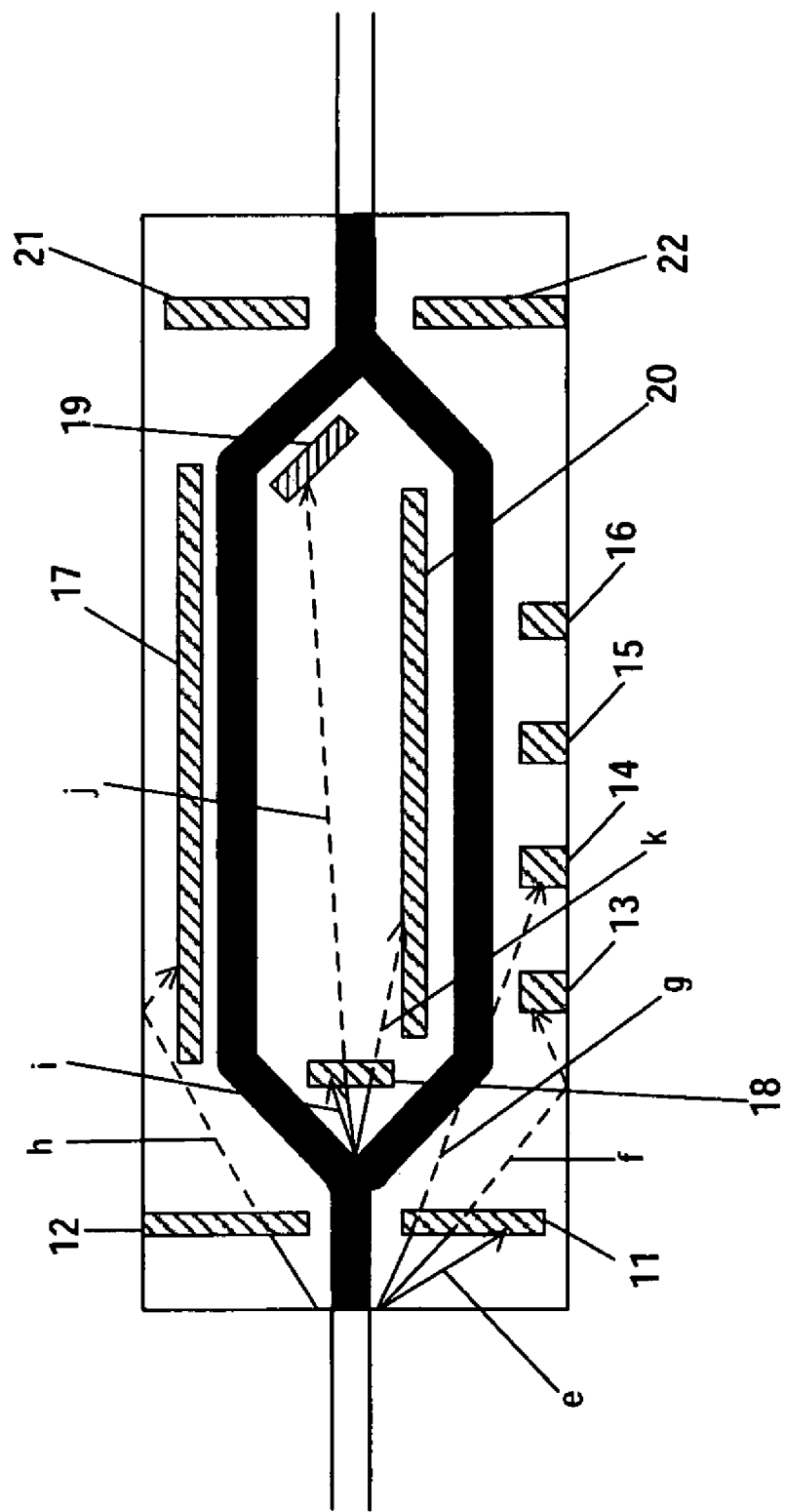
FIG. 2 is a schematic diagram showing the optical modulator provided with the stray light rejection means of the preset invention.

In order to eliminate such effect of the stray light, the present invention places stray light rejection means 11 to 22 adjacent to the optical waveguide such that the mutual interference of the stray light and the light passing through the optical waveguide is restricted as shown in FIG. 2. In particular, each alignment and shape are configured such that the stray light e is rejected with the means 11, the stray lights f and g, which can not be rejected with the means 11 (or in case there is no means 11), are rejected with the means 13 and 14, the stray light h is rejected with the means 12 and 17, the stray light i is rejected with the means 18, and the stray lights j and k are rejected with the means 18, 19 and 20.

The stray light rejection means prevents the stray light from reaching the optical waveguide by forming a groove, depth of which (about 50 μm) is same as that of the optical waveguide, on the surface of the substrate 1 and applying a scattering of the light at the wall surface of the groove.

As the method for forming the groove, there is one easy method where a substrate material is partly removed by laser beam machining and thereby the groove is formed. Besides, well-known processing techniques in the relevant field such as a chemical processing method where the substrate is grooved by etching, or a chemical cutting method of sand blast, etc. can be also applied.

As the method for strengthening the features of stray light rejection in the above groove, the stray light which passes through said groove is blocked by filing a light absorber material such as carbon black into said groove.

Figure 3:
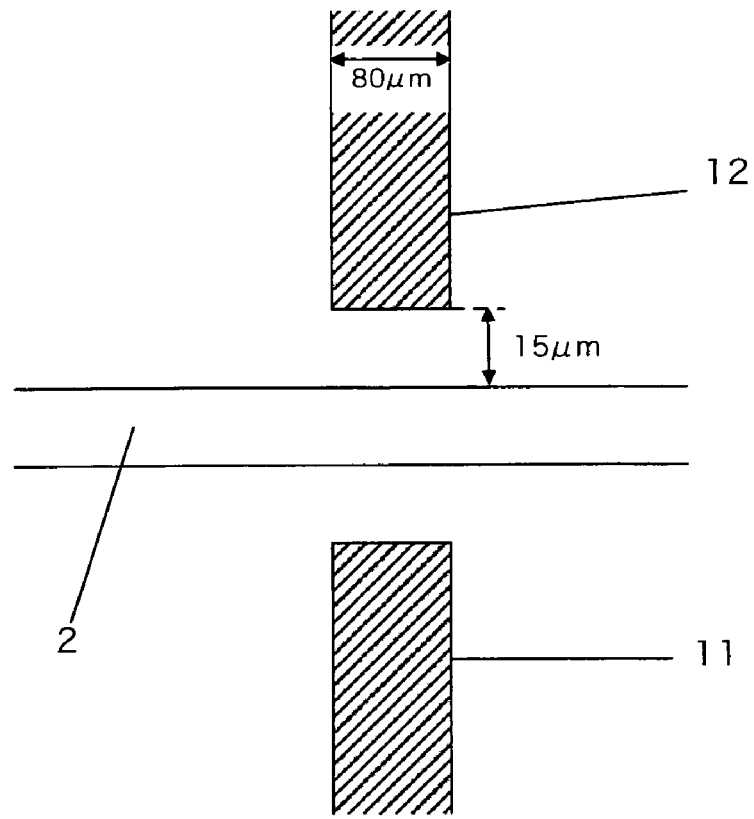
FIG. 3 is a diagram showing the positional relation of the optical waveguide and the stray light rejection means.

Also, in general, as shown in FIG. 3, the closer the optical waveguide (the input waveguide 2 in the diagram) and the stray light rejection means (the grooves 11 and 12) are placed to each other, the higher the rejecting effect becomes. However, there is a technical limit such that the optical waveguide is not damaged but can be formed with accuracy in the production process and it is also necessary to consider reduction of a distortion of the optical waveguide (or the substrate portion where the optical waveguide is formed) in the mechanical process such as a cutting process. The line width of the optical waveguide is normally about 7 μm, and the distance between the edge boundary of the stray light rejection means and the optical waveguide is preferably longer than 10 μm as 15 μm in FIG. 3.

On the other hand, if the above distance is longer than 100 μm, the scattering of the stray light from the optical waveguide and incidence of the stray light to the optical waveguide can not be effectively controlled and therefore, it might not be possible to obtain the desirable stray light rejection effect.

Although the width of the stray light rejection means is set to be 80 μm in FIG. 3, any width is acceptable as long as the groove is formed therein, basically. The stray light rejection means should be formed taking various points into consideration as described below.

The alignment and shape of the stray light rejection means such as groove, though various types can be suggested, are decided based mainly on the following points.

1. Preventing Primarily the Scattering of the Stray Light
(1) One which directly blocks the stray light from the input end of the optical modulator (11, 12, 13 to 16 in FIG. 1)
(2) One which directly blocks the stray light from the branching point of the first branching optical waveguide of the optical modulator (18, 19, 20 in FIG. 1)
(3) One which blocks the stray light reflecting from the side face of the substrate of the optical modulator (13 to 16, 17 in FIG. 1)

Besides, an escaping light could be generated in the second branching optical waveguide or a curve portion of the optical waveguide. It is also necessary to deal with these situations if required.

2. Preventing the Stray Light from Entering the Optical Waveguide

One which places the stray light rejection means adjacent to the surrounding area of the optical waveguide where the stray light should be prevented from entering (17, 19, 20 in FIG. 1)

3. Consideration of the Shape and Lead Wire of the Modulating Electrode and the Grounding Electrode It is also possible to adjust the alignment and shape of the stray light rejection means taking into consideration the shape and lead wire of the modulating electrode and the grounding electrode as 11, 12, 13 to 16 and 17 in FIG. 1.

The second embodiment of the present invention is explained in the following.

Figure 4:
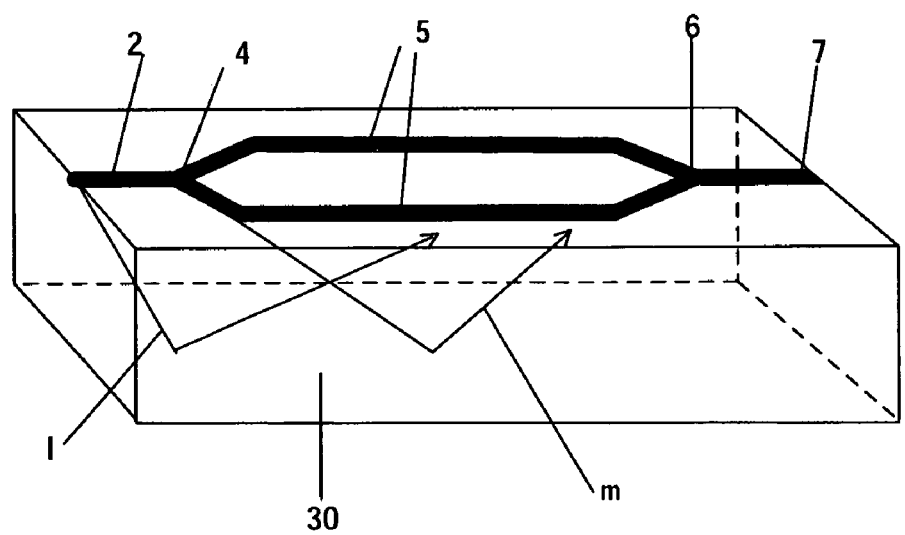
FIG. 4 is a diagram showing the generation status of the stray light passing through to the thickness direction of the substrate in the existing optical modulator.

As shown in FIG. 4, there exist stray lights 1 and m having a vector component in the thickness direction of the substrate for the stray light of the optical modulator, as well as the stray light in parallel with the surface of the substrate.

The stray light like the stray lights 1 and m that moves in the thickness direction of the substrate reflects at a base 30 or the side face of the substrate, enters the optical waveguide, and possibly interferes with the light passing through the optical waveguide.

Figure 5:
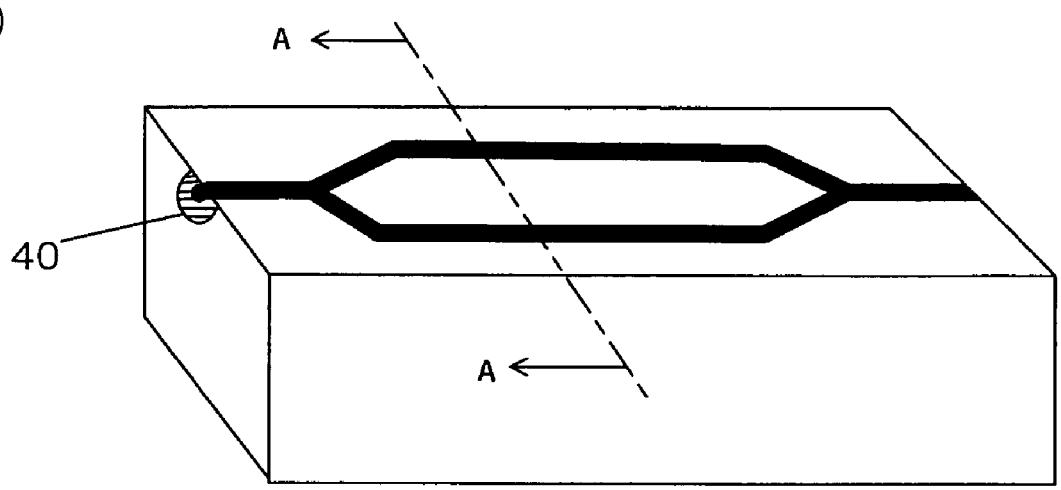
FIG. 5 is a diagram showing the status where the low refractive index area is formed only around the optical waveguide.
Figure 5:
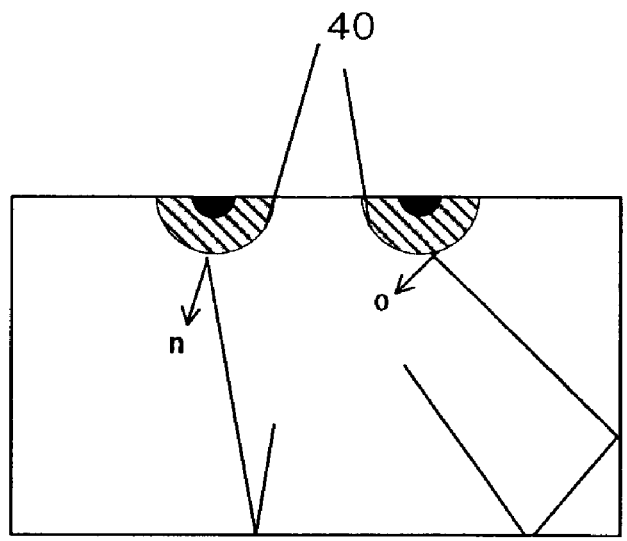

In order to reject such stray light, as shown in FIG. 5, a low refractive index area 40 is formed such that it surrounds the optical waveguide.

By making the refractive index of the low refractive index area lower than that of the substrate, stray lights o and h that are released outside of the low refractive index area are reflected at the boundary surface of the substrate and the low refractive index area, and are thereby prevented from entering the optical waveguide that is placed inside of the low refractive index area.

As the alignment of the low refractive index area against the optical waveguide, besides the one where the low refractive index area surrounds the entire optical waveguide as shown in FIG. 5, it is possible to configure it to reject only the unnecessary stray lights by selectively placing it on the lower portion side or side portion side of the optical waveguide. Preferably, the low refractive index area is formed in the adjacent spaces of the optical waveguide comprising the lower portion side and side portion side of the optical waveguide.

In addition, FIG. 5(*b*) shows a cross-section shape at a dashed line A in FIG. 5(*a*).

Figure 6:
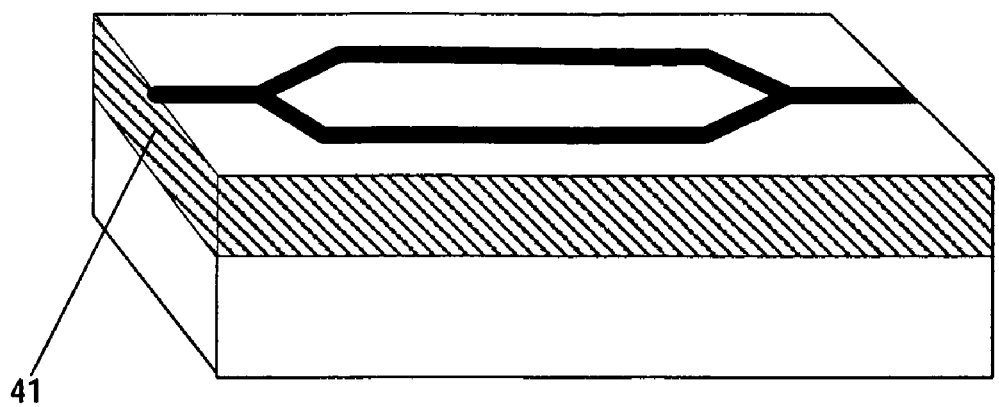
FIG. 6 is a diagram showing the status where the substrate of the optical modulator, to certain thickness, is made the low refractive index area.

As the other alignment of the low refractive index area, as shown in FIG. 6, it is possible to form the low refractive index area over the entire surface of the substrate to certain depth wherein the optical waveguide is comprised. Here, in order to form the low refractive index area in accordance with the shape of the optical waveguide as in FIG. 5, it is necessary to separately prepare a photomask for forming the low refractive index area (however, it is also possible to use at the same time mask pattern for the optical waveguide as described in the following), and therefore, the production process gets complicated and expensive somewhat. On the other hand, when the low refractive index area is formed over the entire surface of the substrate as shown in FIG. 6, it is possible to skip such process.

As the method for forming the low refractive index area, materials such as $MgO$, $ZnO$, $Na_2O$, $Li_2O$, $B_2O_3$, or $K_2O$, having lower refractive index than that of an LN substrate material are diffused over said substrate. In addition, $Fe_2O_3$, $NiO$, or $Cu_2O$, are also impurities which decrease the refractive index. However, they are not preferable since they improve optical loss sensitivity of an LN crystal.

For example, a thermal diffusion method is used as the diffusion method. In particular, the low refractive index material is deposited around an optical waveguide forming area to given thickness by using the mask pattern that is applied in forming the optical waveguide, the substrate is heated to given temperature, and the low refractive index material is thermally diffused in the substrate.

Such thermal diffusion can be conducted before or after the process for forming the optical waveguide. However, it is preferable to conduct it before the process for forming the optical waveguide such that the optical waveguide that has been already formed do not suffer the bad effect by the thermal diffusion processing of the low refractive index material.

In addition, the above described mask pattern is not required in forming the low refractive index area as shown in FIG. 6.

As for the thickness of the low refractive index area, when the thickness is more than the depth of the optical waveguide from the surface of the substrate to the thickness direction of the substrate, it is possible to prevent the stray light that is to enter toward the deepest part of the optical waveguide from entering.

Furthermore, the possible range of avoiding the incidence angle with said low refractive index area out of that of the stray light entering the optical waveguide depends on the refractive index and alignment of the low refractive index area. Particularly, it is effective to place the low refractive area at the lower portion side. However, it is preferable to surround the optical waveguide by the low refractive index area entirely as shown in FIG. 5 and FIG. 6. This enables preventing of the stray light entering the optical waveguide effectively.

Also, by making the refractive index between the deepest part of the low refractive index area and the reverse face of the substrate higher than that of said low refractive index area, it is possible to prevent the stray light reflected at the reverse face of the substrate, or to prevent the stray light from entering the low refractive index area. The incidence of the stray light to the optical waveguide can be effectively restricted as a result. FIG. 5 and FIG. 6 show the one with the refractive index distribution at a constant state between the deepest part of the low refractive index area and the reverse face of the substrate.

In addition, it is possible to form said increasing state by doping Ti, Ta, Fe, Ag, La, and Y, which are materials having the high refractive index, from the reverse face of the substrate into the substrate.

As for the space between the optical waveguide and the low refractive index area, it is preferable to configure it such that said space does not exist by placing the optical waveguide and the low refractive index area adjacent to each other. This is because the stray light escaping from the optical waveguide is reflected at the boundary surface on the side of the optical waveguide of the low refractive index area and thereby generates a problem that the stray light is trapped in the space comprising the optical waveguide in case the optical waveguide and the low refractive index area are formed distantly.

Subsequently, the third embodiment is explained.

Figure 7:
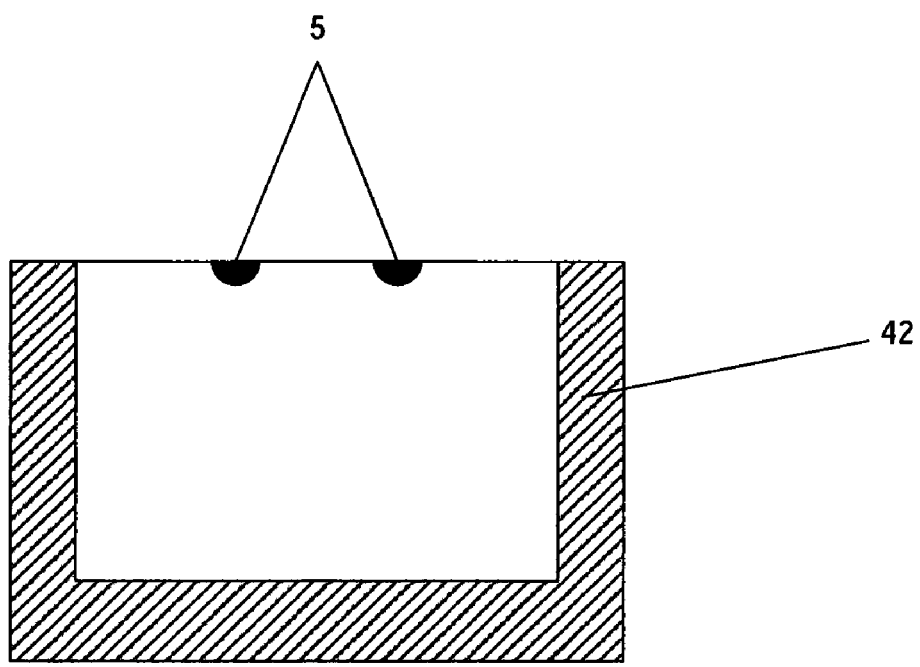
FIG. 7 is a diagram showing the status where the high refractive index area is formed on the reverse face and side face of the optical modulator.

As shown in FIG. 7, a high refractive index area 42 is formed on the reverse face (base) or side face of the substrate. As the method for forming the high refractive index area, doping a material having said high refractive index into the substrate by thermal diffusion etc can form the high refractive index area.

The high refractive index area enables the stray light reflecting at the reverse face or side face of the substrate to be trapped in the high refractive index area, and therefore to be prevented from moving toward the optical waveguide again.

Further, in order to reject stray light reflection from the base or side face of the substrate of the optical modulator more effectively, antireflection treatment, for example coating these faces with an optical absorber material such as carbon black, or an antireflection coating, can be given.

Also, combining above described various embodiments if necessary can improve the effectiveness of stray light rejection further.

As the embodiments of the present invention are described above, the present invention is not limited to the scope of the above embodiments, but comprises the ones where technical configuration is substituted by a technology well know in the art.

As described above, according to the optical modulator of the present invention, because the escaping light from the optical waveguide is prevented from diffusing and the stray light is restricted not to enter the optical waveguide, the photorefractive phenomenon caused by the stray light in the optical modulator can be restricted and it is possible to provide the optical modulator which improves characteristics relating to extinction ratio or optical loss of the signal light.

In particular, this invention is able to restrict the photorefractive phenomenon, the causing the degradation of extinction ratio etc. which appears prominently when the optical modulator with the Mach-Zehnder type optical waveguide has more than 40 GHz of drive or more than 10 mW of optical input power.

The invention claimed is:

1. An optical modulator comprising
a substrate comprised of a material having an electro-optic effect,
an optical waveguide formed on said substrate, and
a modulating electrode for allowing an electric field to work on said optical waveguide, and changing a phase of light passing through said optical waveguide,
wherein said optical waveguide is a Mach-Zehnder type optical waveguide,
stray light rejection means is provided on a surface of said substrate and at least one part of said stray light projection means is disposed between the optical waveguide active part, where the electric field of said modulating electrode works on the optical waveguide, and the substrates side face near said optical waveguide active part.

2. The optical modulator according to claim 1, wherein said stray light rejection means comprises a stray light rejection groove, which is formed on the surface of said substrate, and at least one part of which is formed adjacent to said optical waveguide.

3. The optical modulator according to claim 2, wherein a distance between said stray light rejection groove and said optical waveguide is 10 to 100 μm at closest.

4. The optical modulator according to claim 2, wherein depth of said stray light rejection groove is almost the same as or is more than depth of said optical waveguide.

5. The optical modulator according to claim 2, wherein said stray light rejection groove is filled with a light absorbing material.

6. An optical modulator comprising
a substrate comprised of a material having an electro-optic effect,
an optical waveguide formed on said substrate, and
a modulating electrode for allowing an electric field to work on said optical waveguide, and changing a phase of light passing through said optical waveguide,
wherein said optical waveguide is a Mach-Zehnder type optical waveguide, and
in order to prevent stray light from entering the optical waveguide, a low refractive index area with a refractive index lower than that of said substrate is provided at surrounding area of the optical waveguide including an under portion and a side portion of the optical waveguide, which comprises at least the optical waveguide active part where the electric field of said modulating electrode works on the optical waveguide.

7. The optical modulator according to claim 6, wherein said low refractive index area has a thickness greater than a depth of said optical waveguide in a thickness direction of the substrate from a surface of said substrate, and
a refractive index between a deepest part of said low refractive index area and a reverse face of said substrate is higher than the refractive index of said low refractive index area.

8. The optical modulator according to claim 6, wherein said low refractive index area is formed by diffusion of a low refractive index material having a refractive index lower than that of said substrate, over said substrate.

9. The optical modulator according to claim 8, wherein said low refractive index area comprises MgO or ZnO as the low refractive index material.

10. The optical modulator according to claim 1, wherein antireflection treatment is given on a reverse face or a side face of said substrate.

11. The optical modulator according to claim 1, wherein the frequency of modulation drive is more than 40 GHz.

12. The optical modulator according to claim 1, wherein input power of light input into said optical waveguide element is more than 10 mW.

13. The optical modulator according to claim 3, wherein depth of said stray light rejection groove is almost the same as or is more than depth of said optical waveguide.

14. The optical modulator according to claim 3, wherein said stray light rejection groove is filled with a light absorbing material.

15. The optical modulator according to claim 6, wherein antireflection treatment is given on a reverse face or a side face of said substrate.

16. The optical modulator according to claim 6, wherein the frequency of modulation drive is more than 40 GHz.

17. The optical modulator according to claim 6, wherein input power of light input into said optical waveguide element is more than 10 mW.

* * * * *